(12) United States Patent
Liao et al.

(10) Patent No.: US 10,761,373 B2
(45) Date of Patent: Sep. 1, 2020

(54) DISPLAY DEVICE

(71) Applicant: InnoLux Corporation, Miao-Li County (TW)

(72) Inventors: Shih-Fu Liao, Miao-Li County (TW); I-An Yao, Miao-Li County (TW); Cheng-Yuan Hsiao, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 16/445,438

(22) Filed: Jun. 19, 2019

(65) Prior Publication Data

US 2020/0081298 A1 Mar. 12, 2020

(30) Foreign Application Priority Data

Sep. 6, 2018 (CN) .......................... 2018 1 1038431

(51) Int. Cl.
*G02F 1/133* (2006.01)
*G02F 1/13357* (2006.01)
*G09G 3/36* (2006.01)
*G09G 3/3208* (2016.01)

(52) U.S. Cl.
CPC .. *G02F 1/133611* (2013.01); *G02F 1/133603* (2013.01); *G09G 3/3208* (2013.01); *G09G 3/36* (2013.01); *G09G 2320/0233* (2013.01)

(58) Field of Classification Search
CPC ..................... G02F 1/133611; G02F 1/133603
See application file for complete search history.

(56) References Cited

U.S. PATENT DOCUMENTS

2019/0377228 A1* 12/2019 Saitoh ............... G02F 1/133606

\* cited by examiner

*Primary Examiner* — Anne M Hines
(74) *Attorney, Agent, or Firm* — McClure, Qualey & Rodack, LLP (57) ABSTRACT

A display device is provided. The display device includes a display panel and a backlight module. The backlight module is disposed corresponding to the display panel. The backlight module includes a substrate and a plurality of light emitting units. The substrate has a first surface, and the first surface faces the display panel. The plurality of light emitting units are disposed on the first surface. A first distance between the first surface and the display panel is in a range from 0.8 mm to 9 mm.

18 Claims, 9 Drawing Sheets

DISPLAY DEVICE

CROSS-REFERENCE TO RELATED APPLICATIONS

This application claims priority of China Patent Application No. 201811038431.1 filed on Sep. 6, 2018, the entirety of which is incorporated by reference herein.

BACKGROUND

Field of the Disclosure

The present disclosure relates to a display device, and in particular to a display device with improved brightness uniformity.

Description of the Related Art

Trends in the development of display devices have been toward high dynamic range imaging (HDR) or thinning. These developments have shown that high dynamic range imaging can be improved by local dimming operation of the direct backlight module. In general, there is a spacing between the light-emitting units of direct backlight modules. Therefore, when light is emitted toward the upper display panel, the brightness of the light in the areas above the spaces between the light-emitting units may be lower than the brightness of the light in the areas above the light-emitting units, thereby causing brightness non-uniformity of the light entering the display panel. In order to improve the brightness uniformity of the light entering the display panel, a light mixing area is arranged between the direct backlight module and the display panel. However, this solution does not fit the thin product design. Therefore, a display device that uses a direct backlight module and is thin is one of the most important topics for developments in this field today.

BRIEF SUMMARY

In view of this, the present disclosure provides a display device to solve the above problems.

The embodiment of the present disclosure provides a display device including a display panel and a backlight module. The backlight module is disposed corresponding to the display panel, and the backlight module includes a substrate and a plurality of light-emitting units. The substrate has a first surface, and the first surface faces the display panel. The light-emitting units are disposed on the first surface. A first distance between the first surface and the display panel is in a range from 0.8 mm to 9 mm.

The embodiment of the present disclosure provides a direct type of display device including a display panel and a backlight module. The backlight module includes an optical-film assembly. The optical-film assembly includes at least four prism layers, so as to improve the brightness uniformity of the display device. Moreover, the distance between the optical-film assembly and the light-emitting units may be in a range from 0 mm to 5 mm (0 mm≤the distance between the optical-film assembly and the light-emitting units≤5 mm). Therefore, the thickness of the display device may be reduced, and the display device may meet the requirement of being thin.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

In order to make the purpose, features, and advantages of the present disclosure more obvious, the following embodiments are described with reference to the accompanying drawings. The repeated reference numerals in the embodiments are for the purpose of simplifying the description, and do not mean the relationship between different embodiments. The directional terms mentioned in the following embodiments, such as: up, down, left, right, front or back, etc., refer to the direction of the figures, and are not intended to limit the present disclosure.

It is to be understood that the specifically described or illustrated elements may be in various forms well known to those skilled in the art. In addition, when a layer is "on" another layer or substrate, it may mean "directly" on another layer or substrate, or the layer over another layer or substrate, or it may mean another layer between other layers or substrates.

Moreover, in the embodiments, relative terms such as "lower" or "bottom portion" and "higher" or "top" are used to describe the relative relationship of one element of the figure to another element. If the device in the figures is turned upside down, the element described on the "lower" side will become the element on the "higher" side.

Here, the terms "about" and "substantially" mean within 20% of a given value or range, preferably within 10%, and more preferably within 5%. The quantity given here is an approximate quantity, meaning that the meaning of "about" or "about" may still be implied without specific explanation.

Figure 1:
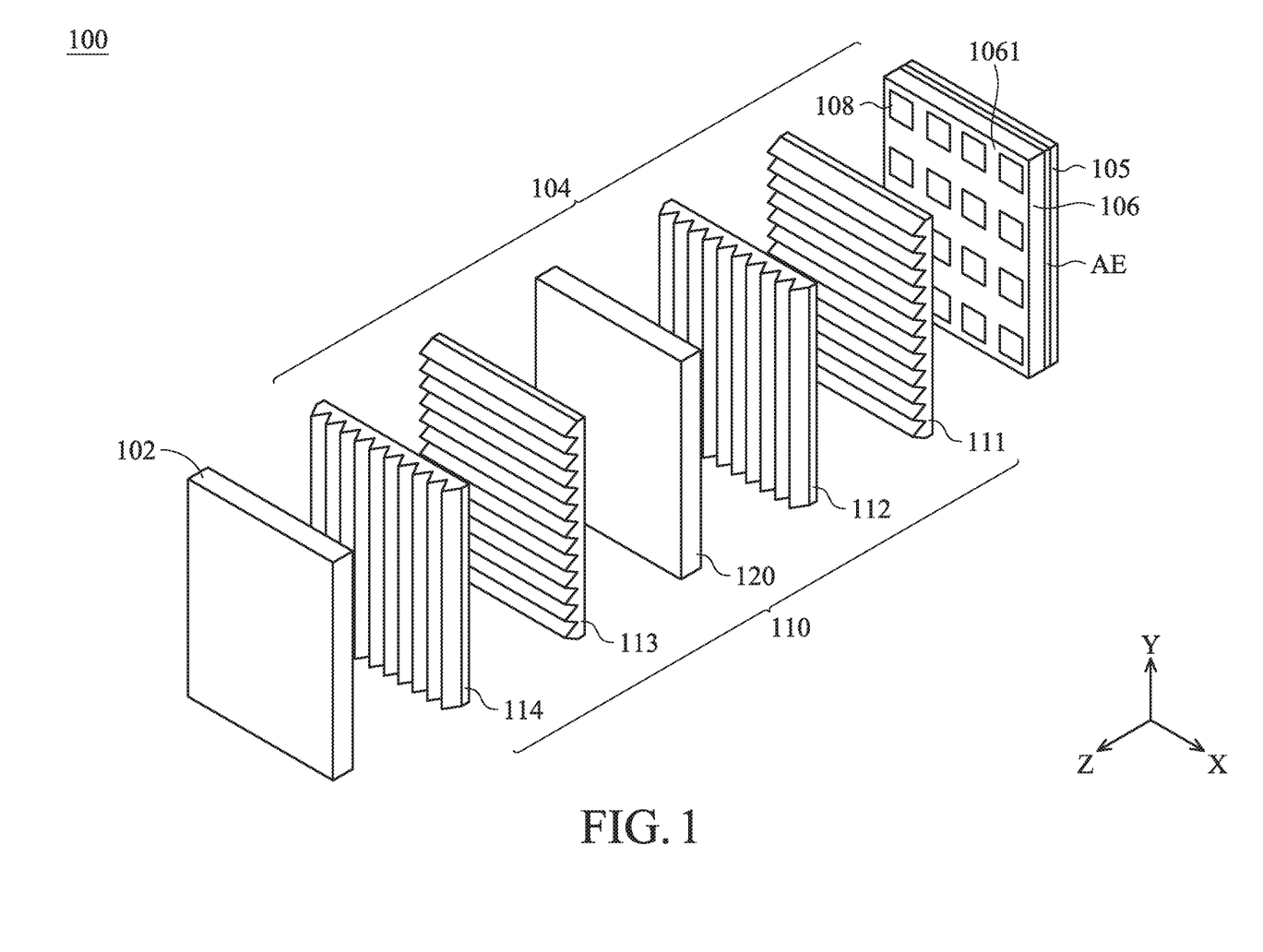
FIG. 1 is an exploded perspective view of a display device in accordance with one embodiment of the present disclosure.
Figure 2:
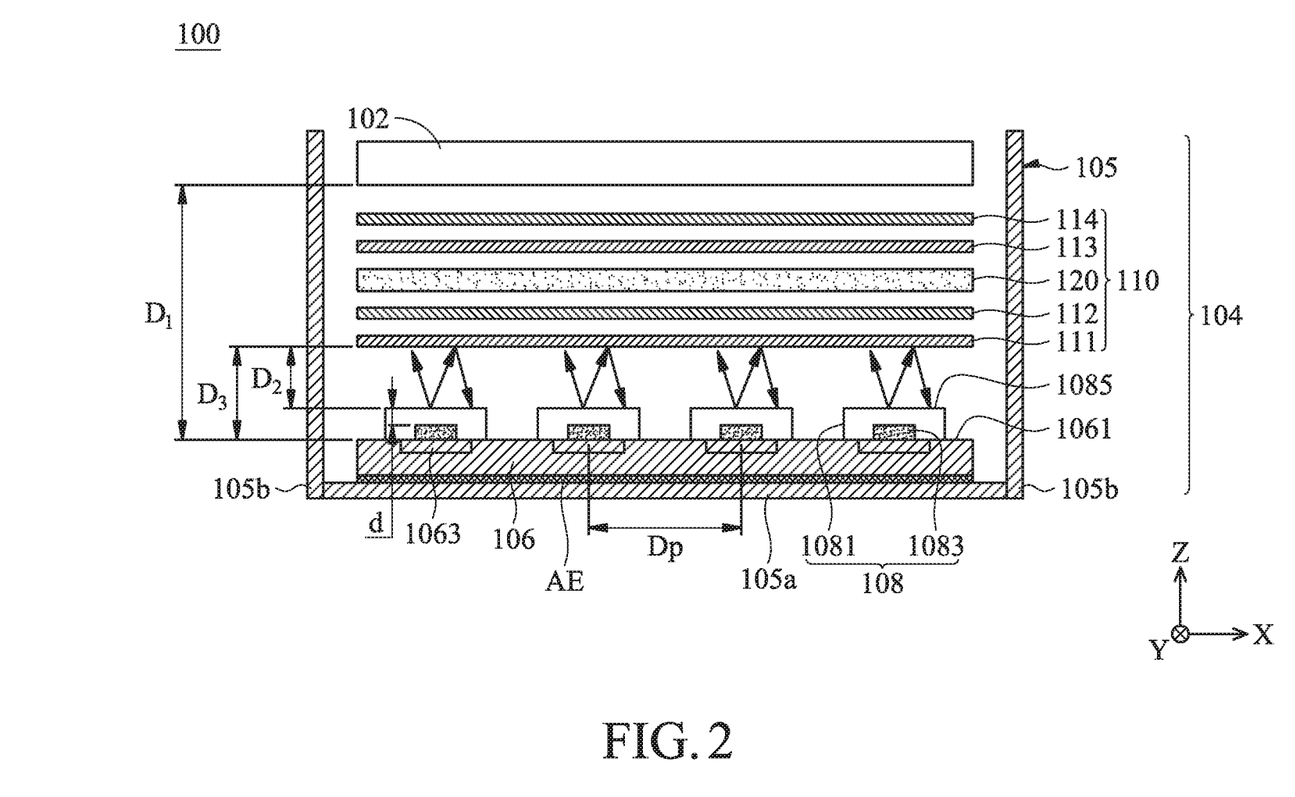
FIG. 2 is a structural schematic view of the display device in accordance with one embodiment of the present disclosure.

FIG. 1 is an exploded perspective view of a display device 100 in accordance with one embodiment. FIG. 2 is a structural schematic view of the display device 100 in accordance with one embodiment. The display device 100 may be a direct type of display device, for example. The display device 100 may include a display panel 102 and a backlight module 104, and the backlight module 104 is disposed corresponding to the display panel 102. As shown in FIG. 1 or FIG. 2, the display panel 102 and the backlight module 104 are disposed in the Z-axis direction. As shown in FIG. 2, the display panel 102 may include two substrates (not shown in figures), a display layer (not shown in figures) and a drive-circuit layer (not shown in figures), and the display layer is disposed between the two substrates. One of the two substrates may be an array substrate, and the other one may be a color-filter substrate, but it is not limited thereto. In other embodiments, the color-filter substrate may be disposed on the array substrate. The materials of the substrate may include glass, quartz, organic polymer or metal. The organic polymer may include, polyimide (PI), polyethylene terephthalate (PET), or polycarbonate (PC), but it is not limited thereto. The drive-circuit layer may include transistors (such as switching transistors, driving transistors, or other transistors), data lines, scan lines, or dielectric layers or other lines, but it is not limited thereto. The color-filter substrate may include a red color filter, a green color filter, a blue filter, or a color filter of other light wave band. In other embodiments, the color-filter substrate may be replaced by light conversion materials. The light conversion materials may include quantum dots (QD), fluorescence, phosphor, another suitable material, or a combination thereof, but it is not limited thereto. The display layer may include liquid crystals (LCs), organic light-emitting diodes (OLEDs), quantum dots, fluorescence, phosphor, light-emitting diodes (LEDs), micro light-emitting diodes (or mini light-emitting diodes) or other display mediums, but it is not limited thereto. In some embodiments, the chip size of the light-emitting diodes is in a range from about 300 μm to 10 μm, the chip size of mini LEDs is in a range from about 100 μm to 300 μm, and the chip size of the micro LEDs is in a range from about 1 μm to 100 μm but there are not limited thereto.

The display device 100 may include a frame 105 configured to receive or mount the display panel 102 and the backlight module 104, but it is not limited thereto. The materials of the frame 105 may include materials with heat dissipation or support effect, but it is not limited thereto. For example, the material of frame 105 may include plastic, metal (including stainless steel, aluminum alloy, other metals or metal alloys), ceramic, other suitable materials or the combination thereof. The frame 105 may be made by injection molding, insert molding, stamping, or another suitable method, but it is not limited thereto. In some embodiments, the frame 105 may be affixed or connected to a substrate 106 of the backlight module 104, for example, by an adhesive element AE or a fixing component (not shown in figures). The adhesive element AE may be double-sided tape, silicone, light-curing adhesive (such as UV glue or light curing adhesive for other wave bands), epoxy resin, acrylic adhesive, moisture curing adhesive, optical clear adhesive (OCA), optical clear resin (OCR), other polymers or the combination thereof, but it is limited thereto. In some embodiments, the frame 105 may include a bottom portion 105a and an extension portion 105b. The extension portion 105b is connected to the bottom portion 105a, wherein the bottom portion 105a is disposed corresponding to the substrate 106. The bottom portion 105a is substantially parallel to the substrate 106. The extension portion 105b has an extension direction, and the extension direction is different from the extension direction of the bottom portion 105a. For example, the angle between the bottom portion 105a and the extension portion 105b may be in a range from 70 degrees to 140 degrees (70 degrees≤the angle≤140 degrees), but it is not limited thereto.

As shown in FIG. 2, the angle between the bottom portion 105a and the extension portion 105b may be about 90 degrees. Moreover, the extension portion 105b may extend in the Z-axis direction. In some embodiments, the thickness of the bottom portion 105a (i.e., the maximum thickness in the Z-axis direction) may be between 0.05 mm and 0.5 mm (0.05 mm≤the thickness of the bottom portion 105a thickness≤0.5 mm). For example, the thickness of the bottom portion 105a may be about 0.1 mm. In some embodiments, the thickness of the adhesive element AE (maximum thickness in the Z-axis direction) may be between 0.02 mm and 0.1 mm (0.02 mm≤the thickness of the adhesive element AE≤0.1 mm). For example, the thickness of the adhesive element AE may be about 0.03 mm, but it is not limited thereto. In one embodiment, the thickness of the bottom portion 105a may be the maximum thickness of the bottom portion 105a in a partial region in the Z-axis direction. In one embodiment, the thickness of the adhesive element AE may be the maximum thickness of the adhesive element AE in a partial region in the Z-axis direction.

As shown in FIG. 2, the backlight module 104 may include the substrate 106, multiple light-emitting units 108, many conductive pads 1063 and an optical-film assembly 110. The substrate 106 may include glass, printed circuit board (PCB), flexible printed circuit board (FPC), other suitable materials, or the combinations thereof, but it is not limited thereto. In some embodiments, the substrate 106 includes a first surface 1061. The first surface 1061 may face the display panel 102. Multiple conductive pads 1063 may be disposed on the first surface 1061, but it is not limited thereto. The light-emitting units 108 may be disposed on the first surface 1061 of the substrate 106, and electrically connected to the conductive pad 1063. The substrate 106 may include some drive circuit (not shown in figures) configured to control or operate the light-emitting units 108. The light-emitting units 108 may be located between the display panel 102 and the substrate 106, and thus the backlight module 104 may be the direct type of backlight module.

The light-emitting units 108 may include LEDs, mini LEDs or micro LEDs, OLEDs, or other suitable light-emitting elements, but it is not limited thereto. In some embodiments, light-emitting units 108 may include light conversion materials. The light conversion materials may include quantum dots, fluorescence, phosphor, other suitable light conversion materials, or the combination thereof, but it is not limited thereto. In some embodiments, the light conversion materials may be disposed adjacent to the light-emitting chip 1083, but it is not limited thereto. The light-emitting chip 1083 may emit blue light, but it is not limited thereto. In other embodiments, different ones of the light-emitting chips 1083 may emit light with different wave bands, such as red light, blue light, green light, ultraviolet (UV), or other light with suitable wave bands, but it is not limited thereto. The materials of the conductive pad 1063 may include Ni, Au, Pt, Ag, Cu, Fe, Ni, Sn, Al, Mg, Pd, Ir, Rh, Ru, Zn, other suitable conductive materials, the alloy thereof or the combination thereof, but it is not limited thereto.

As shown in FIG. 2, the light-emitting units 108 may include a light-emitting diode or a micro light-emitting diode. Each of the light-emitting units 108 may include a package structure 1081 and a light-emitting chip 1083. The light-emitting chip 1083 may be disposed in the package structure 1081, or covered by the package structure 1081, but it is not limited thereto. In some embodiments, there are many light-emitting chips 1083 disposed in one package structure 1081, and the light-emitting chips 1083 may emit light with the same wave band, but it is not limited thereto. When the light-emitting chips 1083 are light-emitting diodes or micro light-emitting diodes, each of the light-emitting chips 1083 may include a p-type semiconductor, a quantum well layer, an n-type semiconductor, an anode electrode, a cathode electrode. The quantum well layer may include a single quantum well (SQW) or a multiple quantum well (MQW). The materials of the quantum well may include Indium gallium nitride (InGaN), gallium nitride (GaN), or the combination thereof, but it is not limited. The light-emitting chips 1083 may be the flip chip type of the light-emitting diodes or the vertical type of the light-emitting diodes, but it is not limited thereto. In some embodiments, the materials of the package structure 1081 may include transparent materials and/or heat resistant materials, but it is not limited thereto. The materials of the package structure 1081 may include epoxy, silicone, other suitable materials, or the combination thereof, but it is not limited thereto. The profile of the cross section of the package structure 1081 in FIG. 2 is a rectangle. However, in some embodiments, the profile of the cross section of the package structure 1081 may be a shape with a curved edge, such as a semi-elliptical shape, a double hill-like shape, or other irregular shapes, but it is not limited thereto. In some embodiments, the package structure 1081 may has a function as an optical lens (the second lens). As shown in FIG. 2, the package structure 1081 of the light-emitting unit 108 has a structural surface 1085. The structural surface 1085 may face the display panel 102. In some embodiments, the structural surface 1085 may be a flat surface, and the structural surface 1085 may be parallel to the first surface 1061. In some embodiments, the structural surface 1085 may be a curved shape, a double hill-like shape, or other irregular shapes.

In addition, in the embodiments of the present disclosure, the optical-film assembly 110 may include a plurality of prism layers, and the number of prism layers is equal to or greater than four. As shown in FIG. 2, the optical-film assembly 110 includes a first prism layer 111, a second prism layer 112, a third prism layer 113 and a fourth prism layer 114. The prism layers may be disposed in Z-axis direction in sequence, wherein the first prism layer 111 is farthest from the display panel 102, and two adjacent prism layers may be in contact with each other or may not be in contact with each other. For example, an air layer or another layer (element) may be between two adjacent prism layers, such as an adhesive element, but it is not limited thereto.

In addition, the backlight module 104 may include a diffusion sheet 120. The diffusion sheet 120 may be made by various method or materials, such as, coating a light diffusing and mixing material layer to an optical film, forming a concave-convex structure on the surface of an optical film, adding scattering particles, diffusing particles or refracting particles inside an optical film, doping hollow beads filled with air or gas inside an optical film or polymer particles, an optical film having a microporous structure therein, the combination thereof, or another suitable material, but it is not limited thereto. In some embodiments, the diffusion sheet 120 may be disposed between two of the prism layers. As shown in FIG. 2, the diffusion sheet 120 may disposed between the second prism layer 112 and the third prism layer 113. Therefore, the interference fringes of the display may be reduced by setting the diffusion sheet.

As shown in FIG. 1, the first prism layer 111 includes one or more protruding structures extending in a first extension direction. The second prism layer 112 includes one or more protruding structures extending in a second extension direction. The third prism layer 113 includes one or more protruding structures extending in a third extension direction. The fourth prism layer 114 includes one or more protruding structures extending in a fourth extension direction. In some embodiments, the one or more protruding structures of the prism layers may face the display panel 102. For example, the protruding structures may be strip-shaped triangular-convex protruding structures as shown in FIG. 1. Therefore, one prism layer may include many protruding structures. In some embodiments, the triangular-convex protruding structures may have a triangular-apex angle in a range from about 70 degrees to 110 degrees. For example, the triangular-apex angle is about 90 degrees.

In some embodiments, the angle between the first extension direction and the X-axis direction is in a range from 0 degrees to 90 degrees (0 degrees≤the angle≤90 degrees). The X-axis direction may be defined as the direction of the arrangement of the light-emitting units 108. In some embodiments, the first extension direction and the second extension direction may be the same or different. In some embodiments, when the first extension direction and the second extension direction are different, the angel between the first extension direction and the second extension direction may be in a range from 1 degree to 90 degrees (1 degree≤the angle≤90 degrees). In some embodiments, the third extension direction and the first extension direction (or the second extension direction) may be the same or different. In some embodiments, the angle between the third extension direction and the second extension direction (or the first extension direction) is in a range from 1 degree to 90 degrees (1 degree≤the angle≤90 degree). In some embodiments, the fourth extension direction and the first extension direction (the second extension direction and/or the third extension direction) may be the same or different. In some embodiments, the extension directions of the protruding structures of two adjacent prism layers may be orthogonal to each other, but it is not limited thereto. In some embodiments, the extension directions of the protruding structures of two adjacent prism layers may be the same.

As shown in FIG. 1, the first extension direction may be parallel to X-axis direction, the second extension direction may be orthogonal to the first extension direction (that is parallel to the Y-axis direction), the third extension direction may be orthogonal to the second extension direction, and the fourth extension direction may be orthogonal to the third extension direction, but there are not limited thereto. In other embodiments, the first extension direction may be parallel to the Y-axis direction. In other embodiments, the first extension direction may be different from the Y-axis direction and the X-axis direction.

By the setting of the prism layers (wherein the number of prism layers is equal to or greater than four), the brightness uniformity of the display device 100 may be improved. As shown in FIG. 2, a component of the light emitted by light-emitting units 108 (for example, 40% to 60% of all of the light) may be reflected, by the prism layers (as indicated by the arrow in FIG. 2). By reflecting light between the optical-film assembly 110 and the first surface 1061, the brightness uniformity of the light entering the display panel 102 may be improved, thereby improving the brightness uniformity of the display device 100.

By the setting of the prism layers, the configuration of the cavity height of the display device may be reduced. In some embodiments, the prism layers may be stacked directly on light-emitting units 108. Moreover, since the prism layer may be slightly wavy, the prism layer may be partially in contact with light-emitting units 108, and some portions of the prism layer are not in contact with light-emitting units 108. Therefore, a second distance D2 is between the structural surface 1085 and the optical-film assembly 110. In some embodiments, the light-emitting units 108 are not aligned with the same plane, which may be substantially parallel to the first surface 1061. Therefore, some of the light-emitting units 108 may be in contact with the optical-film assembly 110, and some of the light-emitting units 108 may be not in contact with the light-emitting units 108. Thus, a second distance D2 is between the structural surface 1085 of the light-emitting unit 108 and the optical-film assembly 110. In detail, the second distance D2 (the cavity height) between the structural surface 1085 and the optical-film assembly 110 is in the Z-axis direction. The second distance D2 may be defined as the minimum distance between the structural surface 1085 and the optical-film assembly 110 in the Z-axis direction. In some embodiments, when the structural surface 1085 is a flat surface (thus, the structural surface 1085 may be substantially parallel to the first surface 1061), then the second distance D2 may be defined as the minimum distance between the approximate central portion of the structural surface 1085 and the optical-film assembly 110 in the Z-axis direction, but it is not limited to the central portion of the structural surface 1085. In some embodiments, When the structural surface 1085 is, for example, a curved surface, a double hill-like surface, or other irregular surface, the second distance D2 may be defined as the minimum distance between the convex portion of the structural surface 1085 and the optical-film assembly 110 in the Z-axis direction, but it is not limited thereto.

In some embodiments, the second distance D2 may be in a range from 0 mm to 1 mm (0 mm≤the second distance D2≤1 mm). In some embodiments, the second distance D2 may be in a range from 0 mm to 0.5 mm (0 mm≤the second distance D2≤0.5 mm). In some embodiments, second distance D2 may be in a range from 0 mm to 0.3 mm (0 mm≤the second distance D2≤0.3 mm).

In addition, a first distance D1 is between the first surface 1061 and the display panel 102. The first distance D1 is defined as the minimum distance between the first surface 1061 and the display panel 102 in the normal direction (Z-axis direction) of the substrate 106. In some embodiments, the first distance D1 may be in a range from 0.8 mm to 9 mm (0.8 mm≤the first distance D1≤9 mm). In some embodiments, the first distance D1 may be in a range from 0.8 mm to 5 mm (0.8 mm≤the first distance D1≤5 mm). In some embodiments, the first distance D1 may be in a range from 0.8 mm to 3 mm (0.8 mm≤the first distance D1≤3 mm).

In addition, a spacing Dp is between two adjacent light-emitting units 108. The spacing Dp is defined as the distance between the center points of two adjacent light-emitting units 108, or between the upper sides, the lower sides, the left sides, or the right sides of two adjacent light-emitting units 108. In some embodiments, the spacing Dp may be in a range from 0.6 mm to 5 mm (0.6 mm≤the spacing Dp≤5 mm), such as 1 mm, but it is not limited thereto. The spacing Dp may be based on actual design needs. In some embodiments, the ratio of the second distance D2 to the spacing Dp may be between 0.1 and 1 (0.1≤D2/Dp≤1). In some embodiments, the ratio of the second distance D2 to the spacing Dp may be in a range from 0.5 to 1 (0.5≤D2/Dp≤1). In some embodiments, the ratio of the second distance D2 to the spacing Dp may be in a range from 0.3 to 1 (0.3≤D2/Dp≤1). Moreover, as shown in FIG. 1 and FIG. 2, the optical-film assembly 110 is disposed between the light-emitting units 108 and the display panel 102. A third distance D3 is between the first surface 1061 and the optical-film assembly 110 in the normal direction (for example, the Z-axis direction) of the substrate 106. The third distance may be defined as the minimum distance between the first surface 1061 and the optical-film assembly 110 in the Z-axis direction. In some embodiments, the third distance D3 may be in a range from 0.4 mm to 2 mm (0.4 mm the third distance D3≤2 mm), but it is not limited thereto. In some embodiments, the third distance D3 may be in a range from 0.4 mm to 1 mm (0.4 mm≤the third distance D3≤1 mm).

In addition, in some embodiments, the prism layer may be a brightness enhancement film (the brightness enhancement film), but it is not limited thereto. In some embodiments, one or some of the prism layers may also be replaced, for example, by an optical film with microstructures. The microstructures may have many protrusion structures. The protrusion structures may include circle shape, ellipse shape, wave shape, or other shapes, but it is not limited thereto. The optical film with microstructures, for example, has the effect of reflecting portion of the light (or diffusing the light).

In addition, in some embodiments, a reflective element may, for example, be disposed on the first surface 1061 of the substrate 106. The reflective element is configured to reflect light or change the path of the light. The reflective element may, for example, include materials of high reflectivity (including white paint, metallic paint, reflective particles, or other materials having reflective properties). The reflective particles may have different particle sizes or different materials. The reflective particles may be composite materials, such as titanium dioxide (TiO2), silicon oxide (SiO2), aluminum oxide (Al2O3) or zinc oxide (ZnO), but it is not limited thereto.

Figure 3:
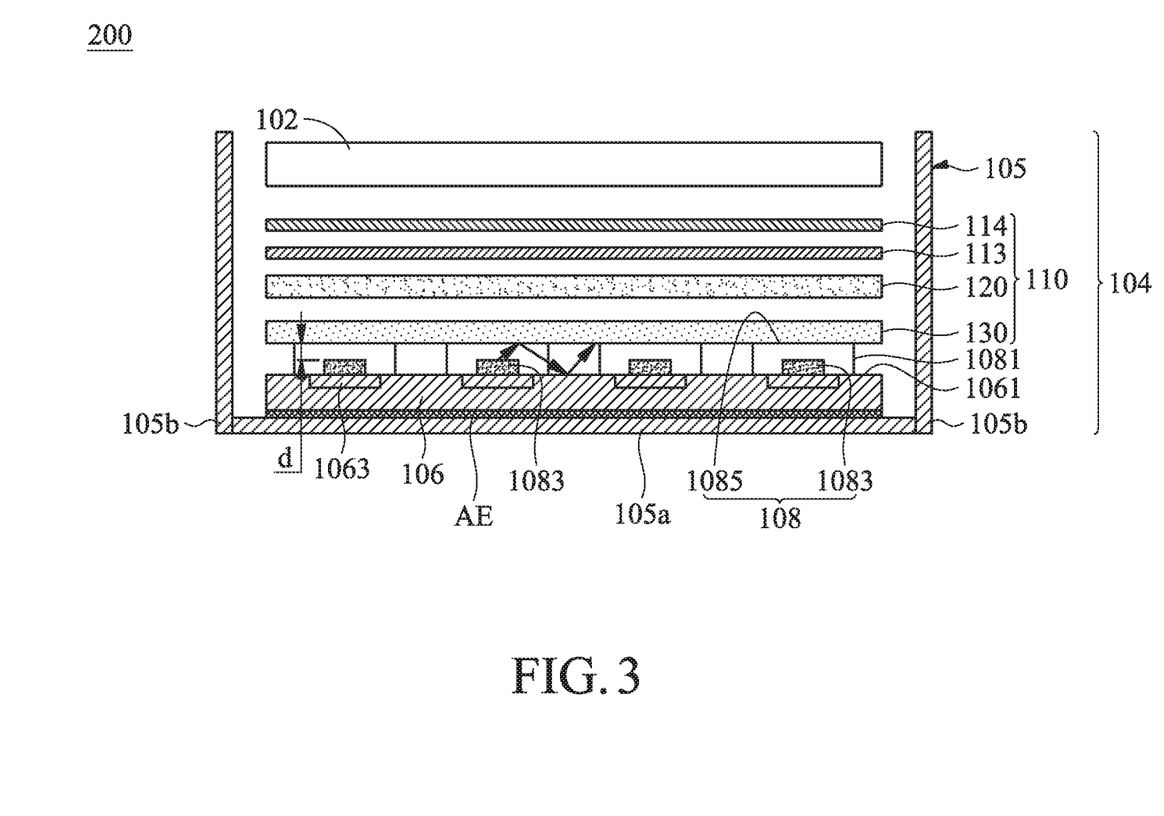
FIG. 3 is a structural schematic view of the display device in accordance with another embodiment of the present disclosure.

FIG. 3 is a structural schematic view of the display device 200 in accordance with another embodiment of the present disclosure. The structure of the display device 200 is similar to the display device 100. The difference is that the display device 200 includes an optical integration element 130, and the optical integration element 130 is disposed between the substrate 106 and the diffusion sheet 120. The optical integration element 130 may include two (or more) prism layers. An adhesive element may, for example, be disposed between two adjacent prism layers, and configured to combine two (or more) prism layers into one optical film, but it is not limited thereto. In some embodiments, the optical integration element 130 may further include a diffusion layer or another suitable optical layer. In some embodiments, the extension directions of the protruding structures of two adjacent prism layers in the optical integration element 130 may be orthogonal to each other. In some embodiments, the extension directions of the protruding structures of two adjacent prism layers in the optical integration element 130 may be different or the same. The adhesive elements may include light transmission materials, including, for example, optically transparent adhesives, polyvinyl butyral resin (PVB), ethylene vinyl acetate (EVA), other suitable materials, or the combination of thereof, but it is not limited thereto.

In some embodiments, the thickness of the optical integration element 130 may be, for example, less than or equal to 1.5 mm, but it is not limited thereto. The thickness of optical integration element 130 may be changed according to requirements. Moreover, as shown in FIG. 3, the optical-film assembly 110 (the optical integration element 130) may be in contact with the package structure 1081 (for example, the structural surfaces 1085) of the light-emitting units 108. The second distance D2 may be in a range from about 0 mm to 0.3 mm (0 mm≤the second distance D2≤0.3 mm). Therefore, the overall thickness of the display device 200 may be reduced (the thickness in the Z axis). It should be noted that the aforementioned "contact" is not limited to the situation that optical-film assembly 110 make full contact with the package structures 1081 of the light-emitting units 108, and an air layer may be between a portion of the optical integration element 130 (or the optical-film assembly 110) and the package structures 1081 of the light-emitting units 108. In some embodiments, the optical-film assembly 110 may not be in contact with the package structures 1081, for example.

In addition, as shown in FIG. 3, a distance d may be between the light-emitting chip 1083 and the structural surface 1085. The light emitted by the light-emitting chips 1083 may, for example, pass through the structural surfaces 1085 of the package structures 1081, and then reflected by the optical-film assembly 110 (as indicated by the arrow) to the first surface 1061 of the substrate 106. After (multiple) reflection, the brightness uniformity of the light entering the display panel 102 may be improved.

In addition, the setting positions of the optical integration element 130, the third prism layer 113, and the fourth prism layer 114 in the display device 200 may be interchanged as appropriate. In some embodiments, the third prism layer 113 and the fourth prism layer 114 may be disposed between the diffusion sheet 120 and the substrate 106. The optical integration element 130 may be disposed between the diffusion sheet 120 and the display panel 102, but it is not limited thereto. In some embodiments, the optical-film assembly 110 may include two (or more) optical integration elements 130, and the diffusion sheet 120 may be disposed between two optical integration elements 130.

Figure 4:
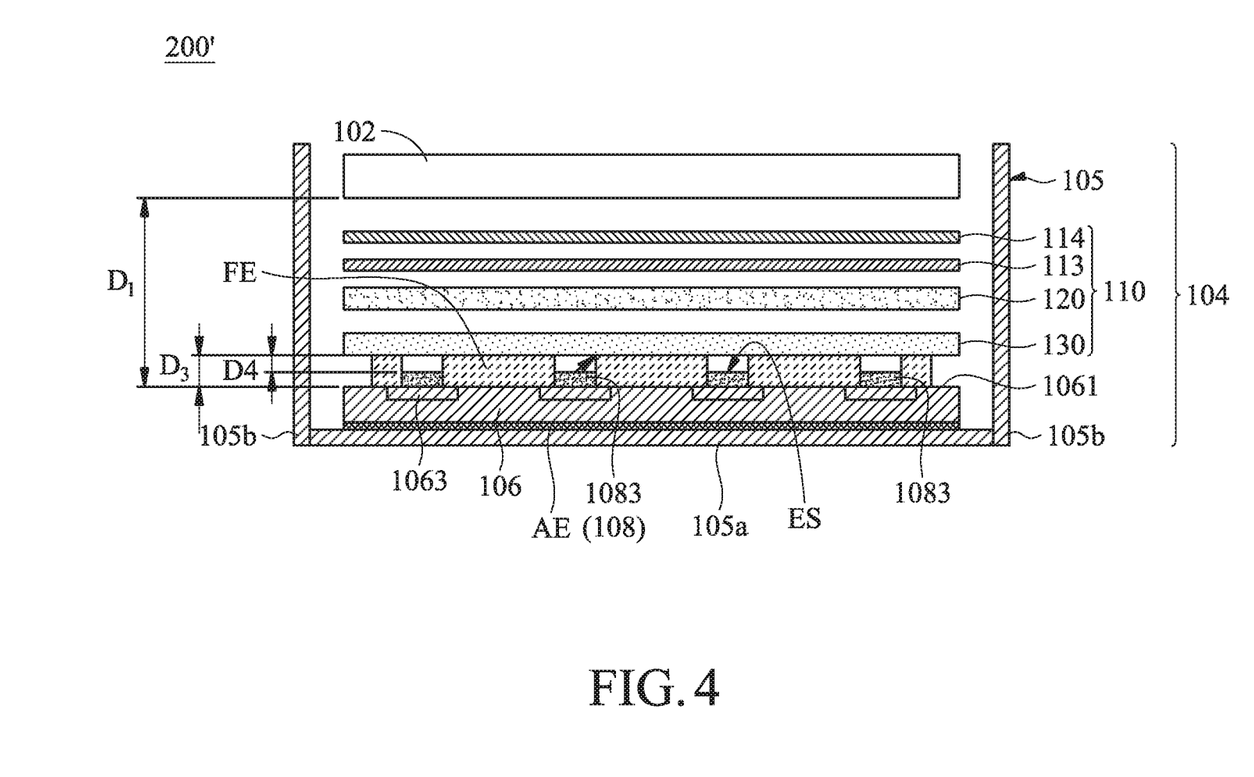
FIG. 4 is a structural schematic view of the display device in accordance with another embodiment of the present disclosure.

FIG. 4 is a structural schematic view of the display device 200' in accordance with another embodiment of the present disclosure. The structure of the display device 200' is similar to the display device 200. The difference is that the light-emitting units 108 of the display device 200' may not include package structures 1081, and the light-emitting chips 1083 has a light emitting surface ES facing the display panel 102. When light-emitting units 108 does not include the package structure 1081, a filling element FE may be disposed between the light-emitting chips 1083, for example, and a portion of a light-emitting chip 1083 (such as the light emitting surface ES of the light-emitting chip 1083) is not covered by the filling element FE. Moreover, a fourth distance D4 is between the light emitting surface ES of the light-emitting chip 1083 and the optical-film assembly 110. The fourth distance D4 may be defined, for example, as the minimum distance between the light emitting surface ES of the light-emitting chip 1083 and the optical-film assembly 110 in the Z-axis direction. In some embodiments, the light emitting surface ES may be defined as the surface of one of the elements (such as p-type semiconductors, quantum wells, n-type semiconductors, anode electrodes, and cathode electrodes) of the light-emitting chip 1083 farthest from one of the substrates 106, but it is not limited thereto.

The quantum well may be a single quantum well (SQW) or a multiple quantum well (MQW). In some embodiments, the filling element FE is disposed adjacent to the side wide of the light-emitting chip 1083, for example. In some embodiments, when the light-emitting units 108 do not include the package structures 1081, and the filling element FE are not disposed among the light-emitting chips 1083. In other words, an air layer may be among the light-emitting chips 1083, for example. Moreover, a fourth distance D4 is between the light emitting surface ES of the light-emitting chip 1083 and the optical-film assembly 110. In some embodiments, the fourth distance D4 may be in a range from about 0 mm to 1 mm (0 mm≤the fourth distance D4≤1 mm), but it is not limited thereto. In some embodiments, the fourth distance D4 is in a range from about 0 mm to 0.3 mm (0 mm≤fourth distance D4≤0.3 mm). In some embodiments, the optical-film assembly 110 (the optical integration element 130) may be in contact with the light-emitting chip 1083 of the light-emitting units 108 (such as the light emitting surface ES), thereby reducing the overall thickness of the display device 200 (the thickness in the Z axis). It should be noted that it is not limited that the optical-film assembly 110 needs to be in full contact with the light-emitting chips 1083, and an air layer may be between a portion of the optical integration element 130 and the light-emitting chips 1083. In some embodiments, the optical-film assembly 110 may not in contact with the light-emitting chips 1083. The filling element FE may include, for example, materials having transparent properties, materials having heat resistance properties, materials having reflective properties, or the combination thereof, but it is not limited. The materials of the filling element FE may be epoxy, silicone, Optical Clear Adhesive (OCA), anisotropic conductive film (ACF), anisotropic conductive paste (ACP), non-conductive film (NCF), non-conductive paste (NCP), photoresist, other suitable materials, or the combination thereof, but it is not limited thereto. In some embodiments, when the filling element FE includes the materials having transparent properties, at least a portion of the filling element FE may be, for example, may be disposed on the light-emitting chip 1083. Therefore, a light mixing space (such as the third distance D3) may be formed between the substrate 106 and the optical-film assembly 110 by using the package structures 1081, the filling element FE, an air layer or other components.

Figure 5:
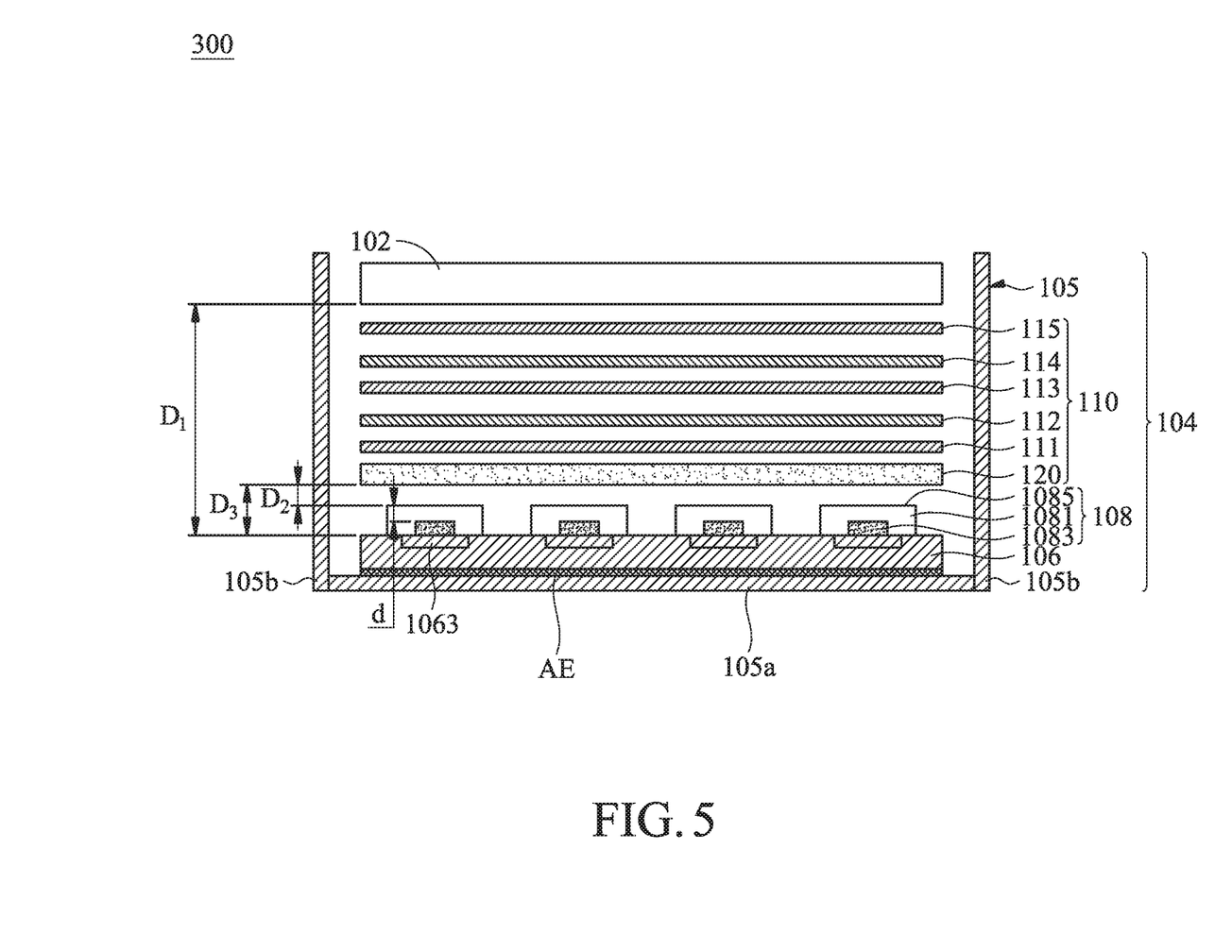
FIG. 5 is a structural schematic view of the display device in accordance with another embodiment of the present disclosure.

FIG. 5 is a structural schematic view of a display device 300 in accordance with another embodiment of the present disclosure. The structure of the display device 300 is similar to the display device 100. The difference is that the display device 200 further includes a fifth prism layer 115 disposed between the display panel 102 and the fourth prism layer 114. The diffusion sheet 120 may be, for example, disposed between the first prism layer 111 and the light-emitting units 108, but it is not limited thereto. In other embodiments, the diffusion sheet 120 may be disposed between any of two adjacent prism layers, or between the prism layer and the display panel 102. The fifth prism layer 115 may include one or more protruding structures. The extension direction (for example, the fifth extension direction) of the protruding structure of the fifth prism layer 115 is different from the fourth extension direction of the protruding structure of the fourth prism layer 114. In some embodiments, the angle between the fifth extension direction and the fourth extension direction may be in a range from about 1 degree to 90 degrees (1 degree≤the angle≤90 degrees). In some embodiments, the fifth extension direction and the fourth extension direction are the same. The brightness uniformity of the display device 300 may be improved by setting more prism layers.

Figure 6:
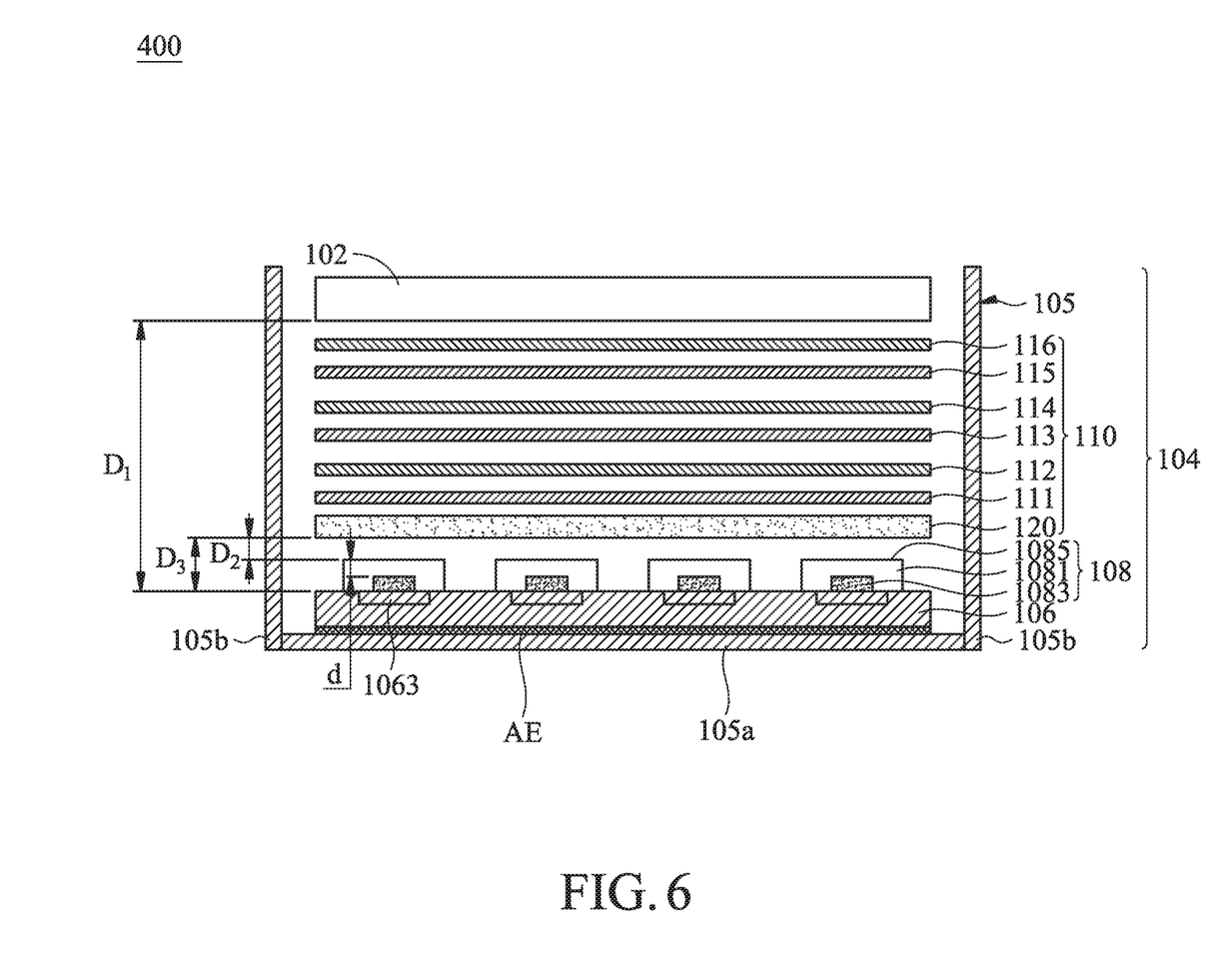
FIG. 6 is a structural schematic view of the display device in accordance with another embodiment of the present disclosure.

FIG. 6 is a structural schematic view of the display device 400 in accordance with another embodiment of the present disclosure. The structure of the display device 400 is similar to the display device 300. The difference is that the display device 400 further includes a sixth prism layer 116 disposed between the display panel 102 and the fifth prism layer 115. Moreover, the sixth prism layer 116 may include one or more protruding structures. The extension direction (such as the sixth extension direction) of the protruding structure of the sixth prism layer 116 is different from the fifth extension direction. In some embodiments, the angle between the sixth extension direction and the fifth extension direction is in a range from about 1 degree to 90 degrees (1 degree≤the angle≤90 degrees). In some embodiments, the fifth extension direction and the sixth extension direction are the same. The brightness uniformity of the display device 400 may be improved by setting more prism layers.

Figure 7:
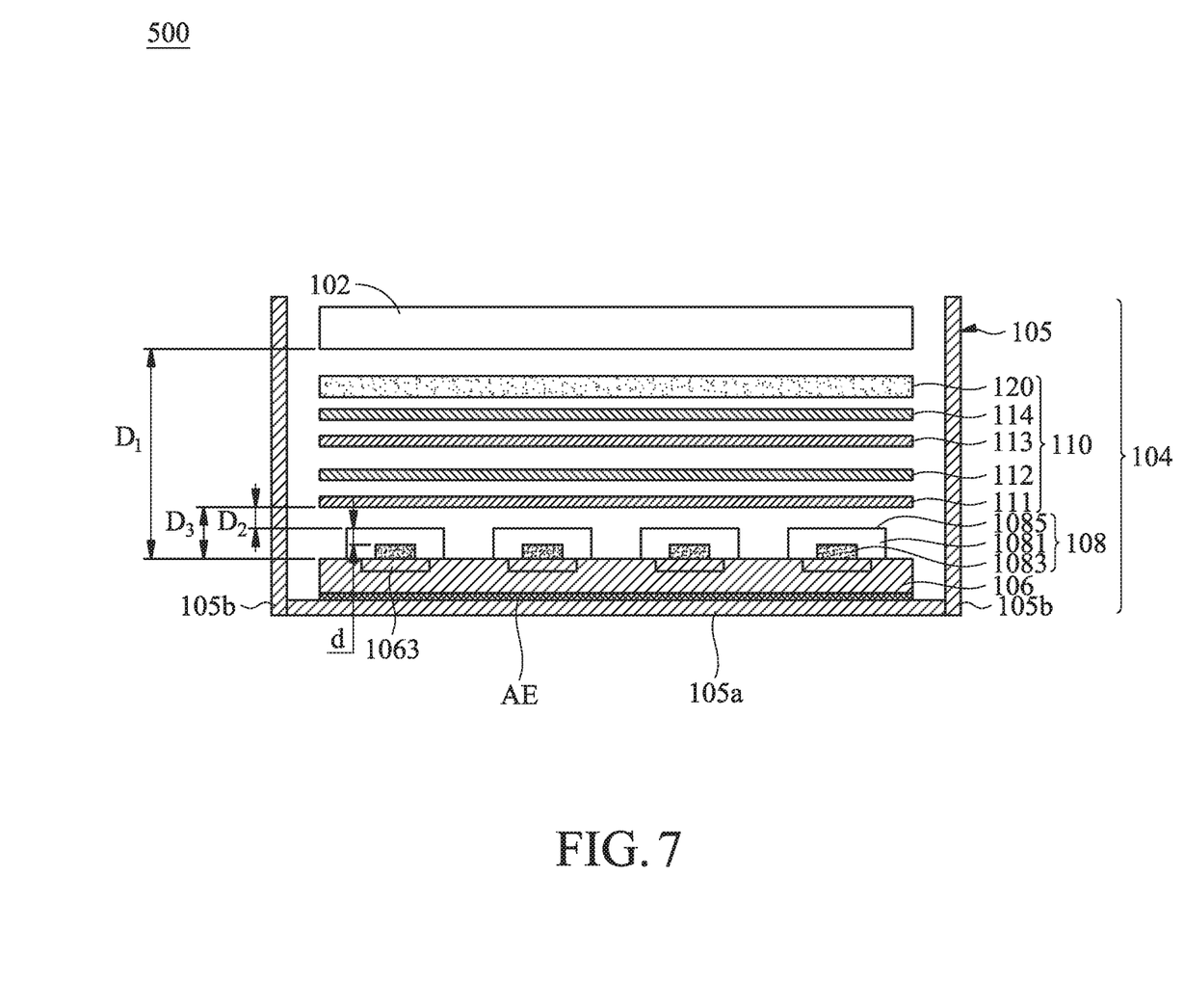
FIG. 7 is a structural schematic view of the display device in accordance with another embodiment of the present disclosure.

FIG. 7 is a structural schematic view of a display device 500 in accordance with another embodiment of the present disclosure. The structure of the display device 500 is similar to the display device 100. The difference is that the diffusion sheet 120 of the display device 500 is disposed between the display panel 102 and the fourth prism layer 114. Therefore, the interference fringes may be reduced by the design.

Figure 8:
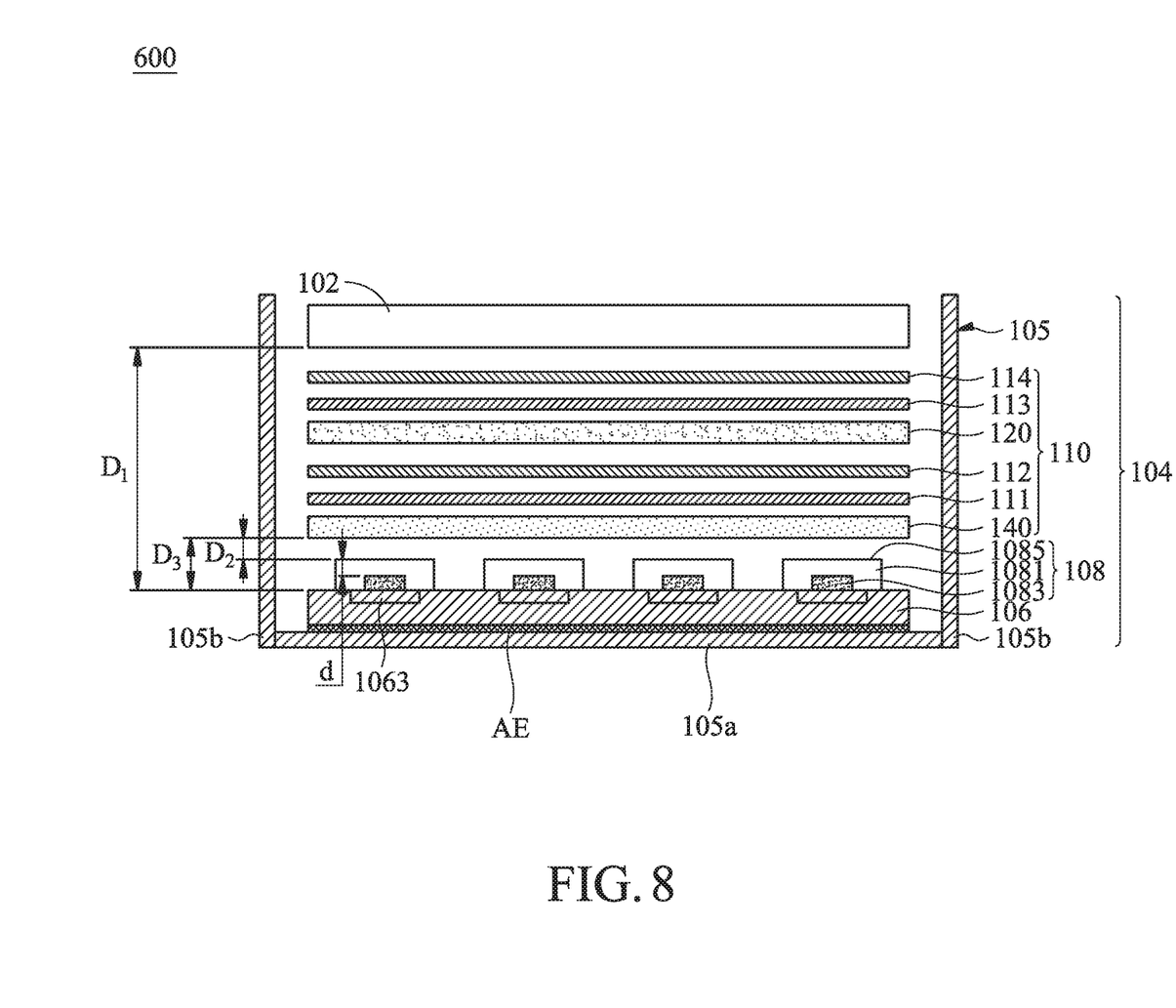
FIG. 8 is a structural schematic view of the display device in accordance with another embodiment of the present disclosure.

FIG. 8 is a structural schematic view of a display device 600 in accordance with another embodiment of the present disclosure. The structure of the display device 600 is similar to the display device 100. The difference is that the display device 600 further includes a diffusion sheet 140 disposed between the substrate 106 and the first prism layer 111. Since the diffusion sheet 140 is disposed between the substrate 106 and the first prism layer 111, the light may be diffused by the diffusion sheet 140 before the light enters the first prism layer 111. The brightness uniformity of the display device 400 may be improved, and the interference fringes may be reduced by the setting of the diffusion sheet 120.

Figure 9:
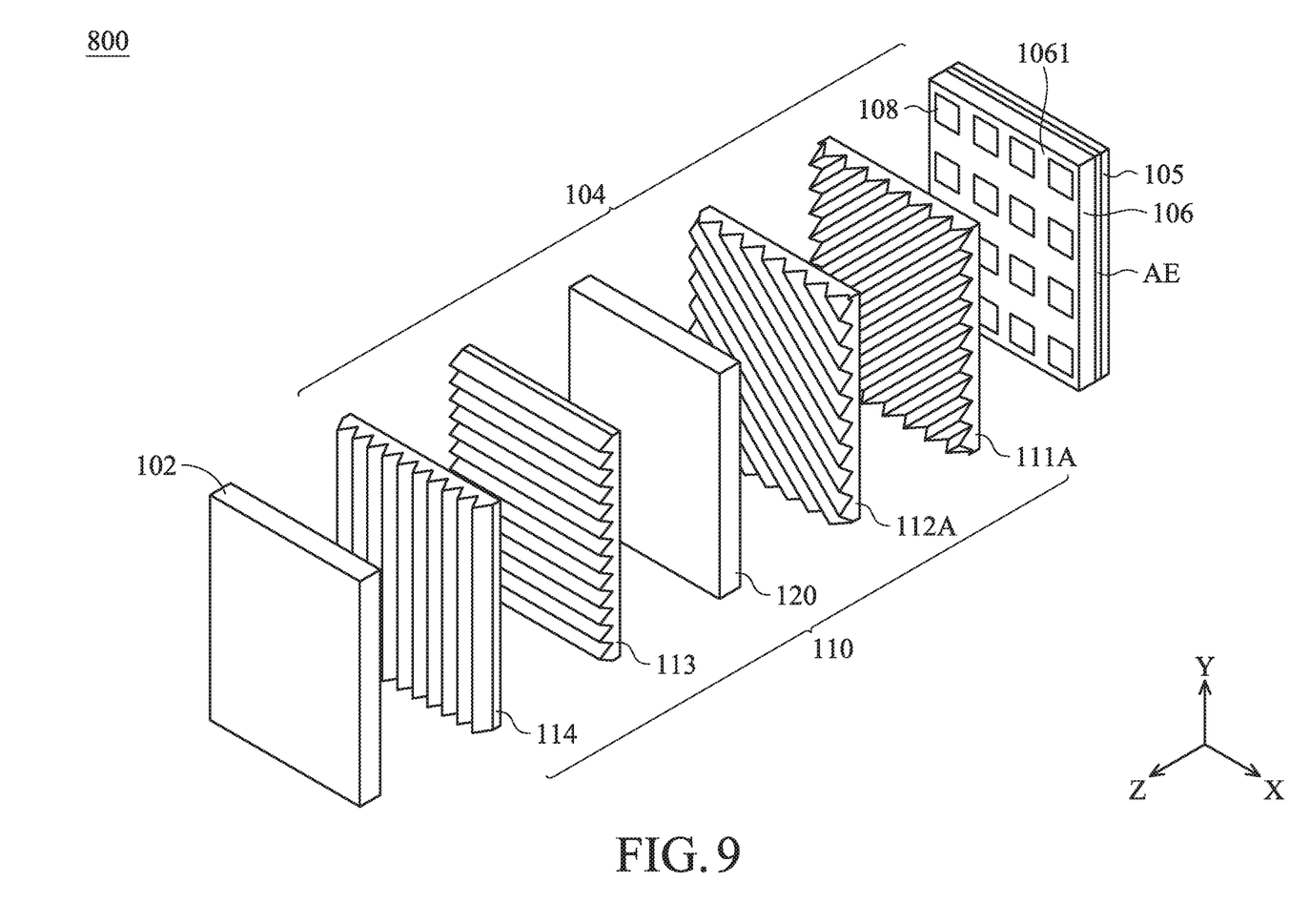
FIG. 9 is an exploded perspective view of the display device in accordance with another embodiment of the present disclosure.

FIG. 9 is an exploded perspective view of a display device 800 in accordance with another embodiment of the present disclosure. The structure of the display device 800 is similar to the display device 100. The difference is that the first extension direction of the protruding structure of the first prism layer 111A in the display device 800 is different from the X-axis direction. In some embodiments, the angle between the first extension direction and the X-axis direction may be in a range from 1 degree to 90 degrees (1 degree≤the angle≤90 degrees). In some embodiments, the first extension direction is the same as or different from the second extension direction of the protruding structure of the second prism layer 112A. When the first extension direction is different from the second extension direction, the angle between the first extension direction and the second extension direction may be in a range from 1 degree to 90 degrees (1 degree the angle 90 degrees). In some embodiments, the third extension direction of the protruding structure of the third prism layer 113 may be the same as or different from the first extension direction (or second extension direction). In some embodiments, the fourth extension direction of the protruding structure of the fourth prism layer 114 may be the same as or different from the first extension direction (the second extension direction or the third extension direction). For example, the angle between the first extension direction and the X-axis direction of FIG. 9 is about 45 degrees, the first extension direction and the second extension direction are, for example, orthogonal to each other, the angle between the second extension direction and the third extension direction may be about 45 degrees, and the third extension direction and the fourth extension direction are, for example, orthogonal to each other, but the present disclosure is not limited thereto. The angle relationship of the extension direction of different prism layers may be adjusted according to requirements. In conclusion, the present disclosure embodiment provides a display device. The display device may be, for example, a direct type of display device, including a display panel 102 and a backlight module 104. Moreover, the backlight module 104 includes an optical-film assembly 110 have four or more prism layers. The optical-film assembly 110 is disposed between the display panel 102 and the substrate 106. The brightness uniformity of the display device may be improved by setting at least four prism layers.

By the design of the present disclosure, the distance between the optical-film assembly 110 and the light-emitting units 108 may be in a range from about 0 mm and 1 mm (0 mm≤the distance between the optical-film assembly 110 and light-emitting units 108≤1 mm). Moreover, the distance between the first surface 1061 and the display panel 102 may be in a range from about 0.8 mm and 9 mm (0.8 mm≤the distance between the first surface 1061 and the display panel 102≤9 mm). Therefore, the overall thickness of the display device may be reduced, which is conducive to the design of a thin display device.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A display device, comprising:
    a display panel; and
    a backlight module corresponding to the display panel, and the backlight module comprising:
    a substrate having a first surface, wherein the first surface faces the display panel;
    a plurality of light-emitting units disposed on the first surface; and
    an optical-film assembly disposed between the light-emitting units and the display panel, wherein the optical-film assembly comprises a plurality of prism layers, a number of prism layers is equal to or greater than four, each of the prism layers comprises a protruding structure, and the protruding structure faces the display panel;
    wherein a first distance between the first surface and the display panel is in a range from 0.8 mm to 9 mm.

2. The display device as claimed in claim 1, further comprising an optical-film assembly disposed between the light-emitting units and the display panel, wherein the light-emitting units are in contact with the optical-film assembly.

3. The display device as claimed in claim 1, further comprising an optical-film assembly disposed between the light-emitting units and the display panel, wherein each of the light-emitting units comprises a package structure, and the package structure has a structural surface facing the display panel, wherein a second distance between the structural surface and the optical-film assembly is in a range from 0 mm to 1 mm.

4. The display device as claimed in claim 1, further comprising an optical-film assembly disposed between the light-emitting units and the display panel, wherein a third distance between the first surface and the optical-film assembly is in a range from 0.4 mm to 2 mm.

5. The display device as claimed in claim 1, further comprising an optical-film assembly disposed between the light-emitting units and the display panel, wherein each of the light-emitting units comprises a light-emitting chip, and the light-emitting chip has a light emitting surface facing the display panel, wherein a fourth distance between the light emitting surface and the optical-film assembly is in a range from 0 mm to 1 mm.

6. The display device as claimed in claim 5, further comprising a filling element adjacent to the light-emitting chip.

7. The display device as claimed in claim 1, wherein an adhesive element is located between two adjacent prism layers.

8. The display device as claimed in claim 1, wherein the backlight module further comprises a diffusion sheet disposed between two of the prism layers.

9. The display device as claimed in claim 1, wherein the prism layers comprise a first prism layer, a second prism layer, a third prism layer and a fourth prism layer, and the prism layers are disposed in sequence, wherein the first prism layer is farthest from the display panel, wherein the protruding structure of the second prism layer extends in a second extension direction, and the protruding structure of the third prism layer extends in a third extension direction, wherein an angle between the second extension direction and the third extension direction is in a range from 1 degree to 90 degrees.

10. The display device as claimed in claim 9, wherein the protruding structure of the first prism layer extends in a first extension direction, and the protruding structure of the second prism layer extends in a second extension direction, wherein an angle between the first extension direction and the second extension direction is in a range from 1 degree to 90 degrees.

11. The display device as claimed in claim 9, wherein the backlight module further comprises a first diffusion sheet disposed between the second prism layer and the third prism layer.

12. The display device as claimed in claim 11, wherein the backlight module further comprises a second diffusion sheet disposed between the substrate and the first prism layer.

13. The display device as claimed in claim 9, wherein the backlight module further comprises a diffusion sheet disposed between the first prism layer and the light-emitting units.

14. The display device as claimed in claim 9, wherein the backlight module further comprises a diffusion sheet disposed between the display panel and the fourth prism layer.

15. The display device as claimed in claim 9, wherein the prism layers further comprise a fifth prism layer disposed between the display panel and the fourth prism layer.

16. The display device as claimed in claim 9, wherein the prism layers further comprise a sixth prism layer disposed between the display panel and the fifth prism layer 1.

17. The display device as claimed in claim 1, wherein the backlight module further comprises an optical integration element disposed on the light-emitting units, and a diffusion sheet disposed on the optical integration element.

18. The display device as claimed in claim 1, wherein the backlight module further comprises a plurality of conductive pads disposed on the first surface, and electrically connected to the light-emitting units.

* * * * *